(12) United States Patent
Burns

(10) Patent No.: US 6,393,166 B1
(45) Date of Patent: May 21, 2002

(54) VARIABLE CHIRP MODULATOR HAVING THREE ARM INTERFEROMETER

(75) Inventor: William K. Burns, Alexandria, VA (US)

(73) Assignee: Codeon Corporation, Columbia, MD (US)

( * ) Notice: Subject to any disclaimer, the term of this patent is extended or adjusted under 35 U.S.C. 154(b) by 0 days.

(21) Appl. No.: 09/535,539

(22) Filed: Mar. 27, 2000

(51) Int. Cl.[7] .................. G02F 1/035; G02F 1/295; G02B 6/42
(52) U.S. Cl. .................. 385/2; 385/4; 385/8; 385/14; 385/15; 359/245
(58) Field of Search .................. 385/2, 4, 8, 14–15; 359/245, 254, 299, 315

(56) References Cited

U.S. PATENT DOCUMENTS

| | | | |
|---|---|---|---|
| 5,074,631 A | 12/1991 | Hamano et al. | 385/3 |
| 5,303,079 A | 4/1994 | Gnauck et al. | 359/188 |
| 5,408,544 A | 4/1995 | Seino | 385/3 |

OTHER PUBLICATIONS

William K. Burns, 3×2 Channel Waveguide Gyroscope Couplers: Theory, IEEE Journal of Quantum Electronics, vol. QE–18, No. 10, Oct. 1982, pp. 1790–1796.

A. H. Gnauck et al., Dispersion Penalty Reduction Using an Optical Modulator with Adjustable Chirp, IEEE Photonics Technology Letters, vol. 3, No. 10, Oct. 1991, pp. 916–918.

*Primary Examiner*—John D. Lee
*Assistant Examiner*—Jerry T. Rahll
(74) *Attorney, Agent, or Firm*—Morgan, Lewis & Bockius LLP

(57) ABSTRACT

An electrically tunable optical modulator includes a substrate having an electrooptical effect, an optical waveguide having first, second, and third cascading portions in the substrate, and transmitting an optical field, a first coplanar waveguide electrode having a first part over the first cascading portion and second and third parts extending beyond the first cascading portion, a second coplanar waveguide electrode having a fourth part over the second cascading portion and fifth and sixth parts extending beyond the second cascading portion, a third coplanar waveguide electrode having a seventh part over the third cascading portion and eighth and ninth parts extending beyond the third cascading portion, a fourth coplanar waveguide electrode, a fifth coplanar waveguide electrode formed between the first and second coplanar waveguide electrodes, respectively, a sixth coplanar waveguide electrode formed between the second and third coplanar waveguide electrodes, and a seventh coplanar waveguide electrode.

16 Claims, 4 Drawing Sheets

VARIABLE CHIRP MODULATOR HAVING THREE ARM INTERFEROMETER

BACKGROUND OF THE INVENTION

1. Field of the Invention

The present invention relates to an optical modulator, and more particularly, to a variable chirp modulator having a three-arm interferometer. Although the present invention is suitable for a wide scope of applications, it is particularly suitable for controlling a chirp in operating an optical modulator.

2. Discussion of the Related Art

An integrated optical modulator is of great interest in operating a fiber optical communication system in the range of 2.5 to 10 Gbps (Giga bits per second), and potentially in the range of 40 Gbps or above. A great deal of research has been carried out to quantify signal frequency broadening for different types of modulation. This effect is known as chirp. Chirp can cause loss of signal fidelity after propagating down the optical fiber due to a wavelength dispersion. In other words, chirp interacts with the dispersion profile of the transmission fiber to severely limit the distance over which error-free data is possible.

There has been an effort to provide either fixed (zero or non-zero) or variable chirp by varying an arrangement of the system. Generation of chirp is system dependent, and it may include zero chirp, variable chirp, or chirp at a fixed non-zero value. Generally, modulators with variable chirp are more complicated, or require a more complex electrical driving scheme than fixed chirp modulators.

A conventional approach to control a chirp in external modulators has been to use an amplitude modulator and a phase modulator in series. They are driven with adjustable voltages or pre-selected electrode lengths are used to obtain a desired value of chirp. A disadvantage of this approach is that the series configuration of the modulators generally leads to higher drive voltages due to a limited available device length. Fixed, non-zero amounts of chirp can be obtained in a single Mach Zehnder amplitude modulator in which the arms of the interferometer are driven with independent drive voltages with adjustable amplitude and phase. A drive voltage or a voltage required to operate the modulator from an off-state to an on-state is one of the important features for external modulators. By minimizing the voltage, drive power required to operate the modulator can be minimized.

For Mach Zehnder amplitude modulators biased at their quadrature or linearly operating point, zero chirp can be obtained by driving the arms of the interferometer in a symmetrical fashion, so that the light in each arm receives equal and opposite phase shifts. One way to achieve this feature is to apply equal and oppositely directed electric fields to each arm of the interferometer, while ensuring that the electro-optic overlap integrals are the same for each arm. Fixed non-zero chirp may be created by varying a magnitude of the field, a magnitude of the overlap integral, or both in one of the interferometer arms. The conventional art does not allow for a device in which zero and adjustable values of non-zero chirp can be achieved in a single device.

SUMMARY OF THE INVENTION

Accordingly, the present invention is directed to a variable chirp modulator having a three arm interferometer that substantially obviates one or more problems due to limitations and disadvantages of the related art.

Another object of the present invention is to provide an optical modulator controlling a chirp in operating an optical communication system.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electrically tunable optical modulator includes a substrate having an electrooptical effect, an optical waveguide having first, second, and third cascading portions in the substrate, and transmitting an optical field, a first coplanar waveguide electrode having a first part over the first cascading portion and second and third parts extending beyond the first cascading portion, a second coplanar waveguide electrode having a fourth part over the second cascading portion and fifth and sixth parts extending beyond the second cascading portion, a third coplanar waveguide electrode having a seventh part over the third cascading portion and eighth and ninth parts extending beyond the third cascading portion, a fourth coplanar waveguide electrode formed to have a first distance from the first coplanar waveguide electrode, a fifth coplanar waveguide electrode formed between the first and second coplanar waveguide electrodes to have second and third distances, respectively, a sixth coplanar waveguide electrode formed between the second and third coplanar waveguide electrodes to have fourth and fifth distances, respectively, a seventh coplanar waveguide electrode formed to have a sixth distance from the third coplanar waveguide electrode, and a voltage source supplying voltages to the first, second, and third coplanar waveguide electrodes, wherein the fourth to seventh coplanar waveguide electrodes are grounded and the first to sixth distances are substantially the same, so that electrooptic overlap integrals of each cascading portion of the optical waveguide are the same.

In another aspect of the present invention, a wavelength division multiplexed optical transmission system having an electrically tunable optical modulator, the modulator includes a substrate having an electrooptical effect, an optical waveguide having first, second, and third cascading portions in the substrate, and transmitting an optical field, a first coplanar waveguide electrode having a first part over the first cascading portion and second and third parts extending beyond the first cascading portion, a second coplanar waveguide electrode having a fourth part over the second cascading portion and fifth and sixth parts extending beyond the second cascading portion, a third coplanar waveguide electrode having a seventh part over the third cascading portion and eighth and ninth parts extending beyond the third cascading portion, a fourth coplanar waveguide electrode formed to have a first distance from the first coplanar waveguide electrode, a fifth coplanar waveguide electrode formed between the first and second coplanar waveguide electrodes to have second and third distances, respectively, a sixth coplanar waveguide electrode formed between the second and third coplanar waveguide electrodes to have fourth and fifth distances, respectively, a seventh coplanar waveguide electrode formed to have a sixth distance from the third coplanar waveguide electrode, and a voltage source supplying voltages to the first, second, and third coplanar waveguide electrodes, wherein the fourth to seventh coplanar waveguide electrodes are grounded and the first to sixth distances are substantially the same, so that electrooptic overlap integrals of each cascading portion of the optical waveguide are the same.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
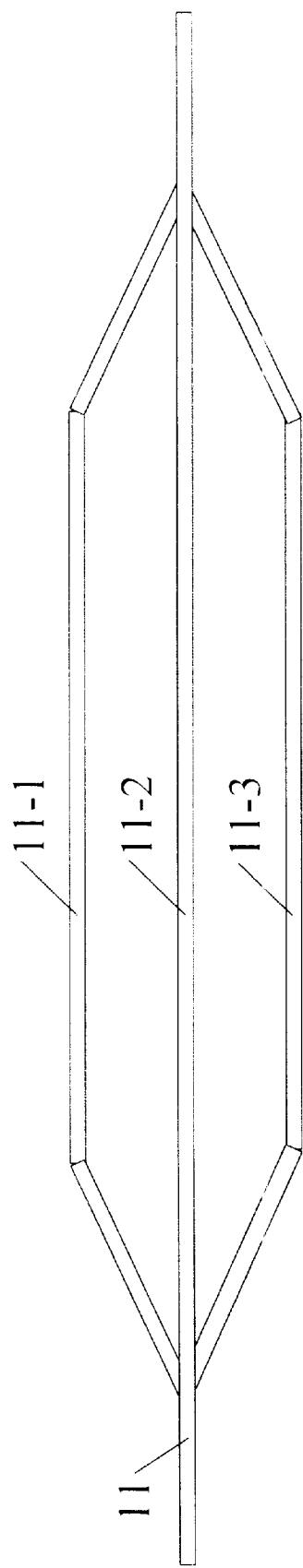
FIG. 1 is a top view of a three-arm interferometer for variable chirp in the present invention.

In the present invention, a three-arm interferometer configuration is proposed, as shown in FIG. 1. An optical waveguide 11 having first, second, and third arms 11-1, 11-2, and 11-3 is formed in a substrate 10. A Z-cut LiNbO$_3$ substrate may be an example of the substrate 10 because a lower drive voltage is generally obtained with the Z-axis crystal orientation. Thus, the Z-cut LiNbO$_3$ substrate is utilized for a broadband low drive voltage modulator having an electrooptical effect. Alternatively, when horizontally directed fields generated by an appropriate electrode configuration are utilized, X or Y-cut LiNbO$_3$ substrate or any other electro-optic materials may be used in the present invention. Further, the present invention may be applied to any material system in which vertically or horizontally directed fields are employed.

Figure 2:
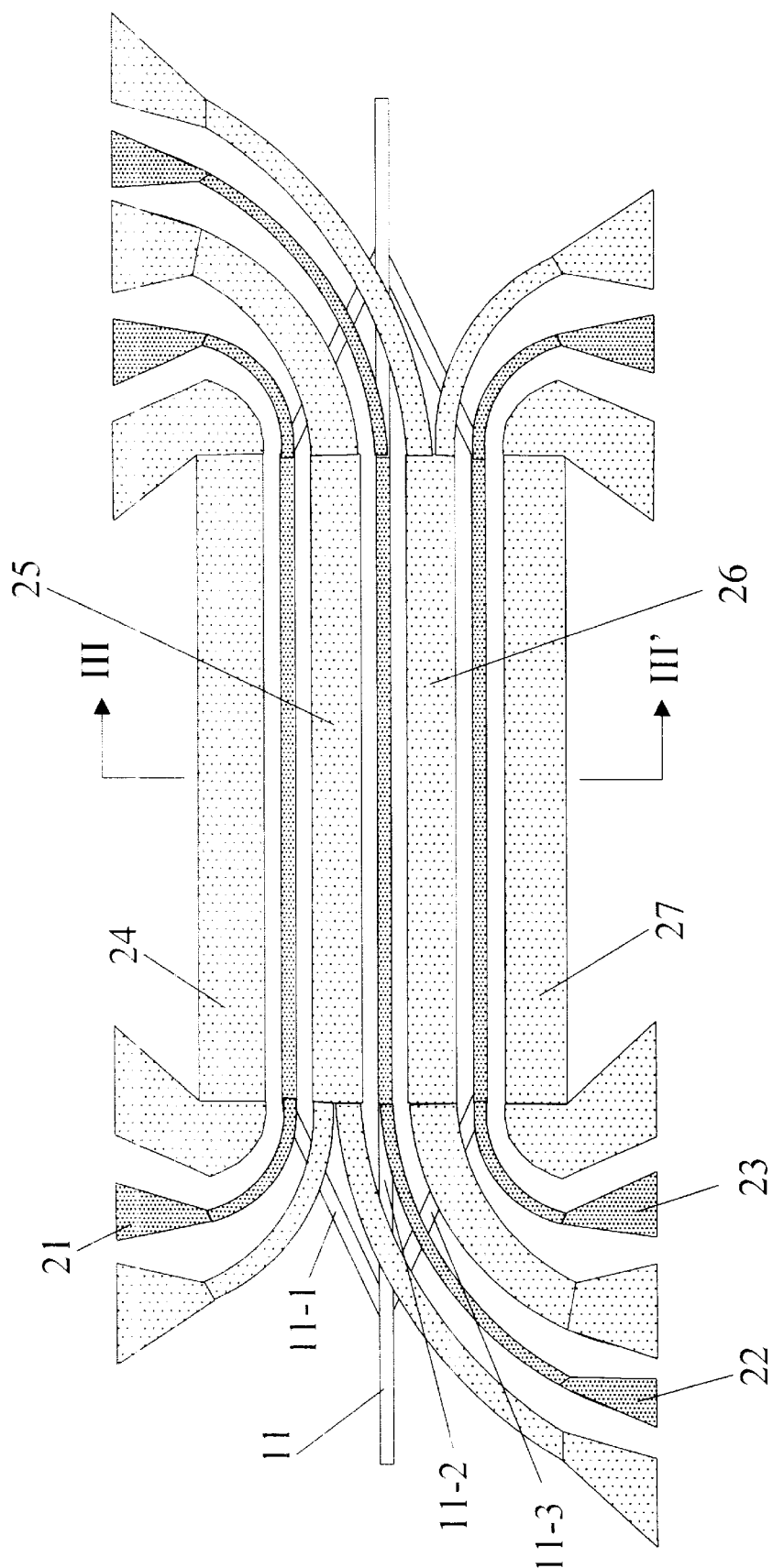
FIG. 2 is a top view of a three-arm Mach Zehnder interferometer type modulator having coplanar waveguide electrode structure in the present invention.

Each arm has an identical width, so that uncoupled modes of the waveguide have an equal optical phase velocity. Input and output waveguides of the interferometer support a single transverse optical mode. Using the three-arm interferometer in FIG. 1, a Mach Zehnder interferometer type modulator is implemented in the present invention, as shown in FIG. 2. The modulator is driven with three geometrically identical coplanar waveguide structures. The arms are separated far enough from one another that the three coplanar waveguide structures are electrically independent.

More specifically, an optical waveguide 11 has first, second, and third arms 11-1, 11-2, and 11-3 which are formed in the substrate 10, so that an optical field is transmitted through the optical waveguide 11 including the three arms 11-1, 11-2, and 11-3. On the optical waveguide 11, first to seventh coplanar waveguide electrodes 21 to 27 are formed. Specifically, the first coplanar waveguide electrode 21 has a first part over the first cascading portion 11-1 of the optical waveguide 11 and second and third parts to extend beyond the first cascading portion 11-1. Similarly, the second and third coplanar waveguide electrodes 22 and 23 have a first part over the second and third cascading portions 11-2 and 11-3 of the optical waveguide 11, respectively, and second and third parts extending beyond the second and third cascading portions 11-2 and 11-3.

A voltage source (not shown) supplies voltages to the first, second, and third coplanar waveguide electrodes 21, 22, and 23 while the fourth, fifth, sixth, and seventh coplanar waveguide electrodes 24, 25, 26, and 27 are grounded. Bias voltages may be applied equivalently either to the electrodes above both the first and third cascading portions 11-1 and 11-3 or to the electrode above the second cascading portion 11-2.

Figure 3:
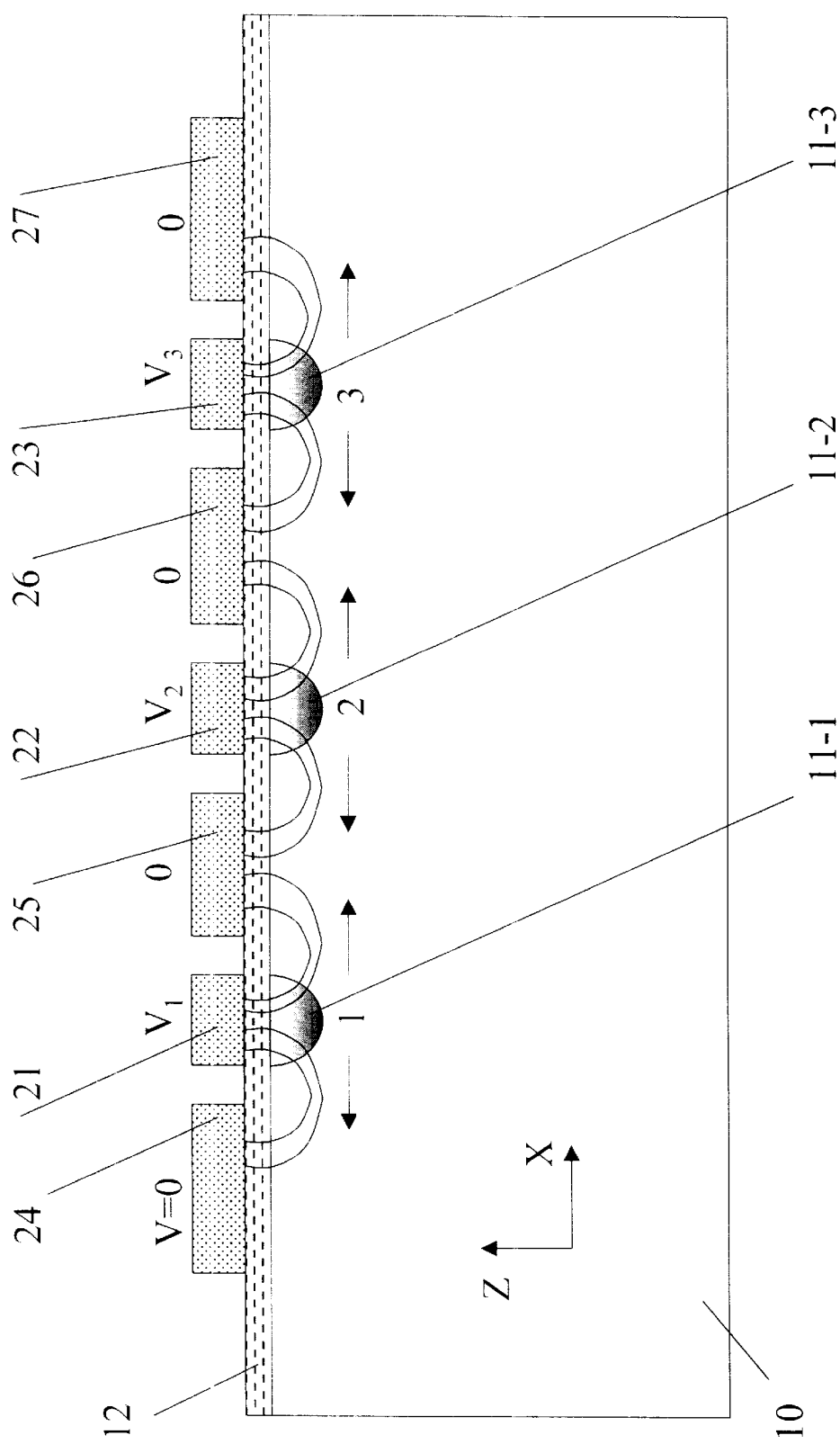
FIG. 3 is a cross-sectional view taken along the line III–III' of FIG. 2 illustrating the Mach Zehnder interferometer type modulator in the present invention.

FIG. 3 is a cross-sectional view taken along the line III–III' of FIG. 2. As shown in FIG. 3, a buffer layer 12, for example, a SiO$_2$ layer, is formed above the optical waveguide 11 and the substrate 10. The first, second, and third coplanar waveguide electrodes 21, 22, and 23 have a width substantially the same.

The fourth to seventh coplanar waveguide electrodes 24 to 27 have widths substantially greater than the first, second, and third coplanar waveguide electrodes 21, 22, and 23. Thus, electrooptic overlap integrals of each cascading portion of the optical waveguide become substantially the same, as shown in FIG. 3.

For example, a width for hot electrodes (electrodes supplied with voltage) is 5 to 10 $\mu$m, and a gap between the interferometer arms is 10 to 50 $\mu$m, and an electrode thickness is about 10 to 50 $\mu$m. A width for ground electrodes may be in the range of 100 $\mu$m to a few mm. A SiO$_2$ buffer layer has a thickness of 0.25 to 1.5 $\mu$m. Each of the coplanar waveguide electrodes is connected through a terminating resistor.

In this embodiment, the electrodes above the two outer arms 11-1 and 11-3 are driven with drive voltages having the same amplitude and sign. The electrode above the inner arm 11-2 may be driven with a voltage varying in amplitude and sign from the voltage delivered to the electrodes above the outer arms 11-1 and 11-3. In FIG. 3, lines of the electric field are shown when positive voltages are applied to the first, second, and coplanar waveguide electrodes 21, 22, and 23. However, negative voltages may also be applied to those electrodes.

Figure 4:
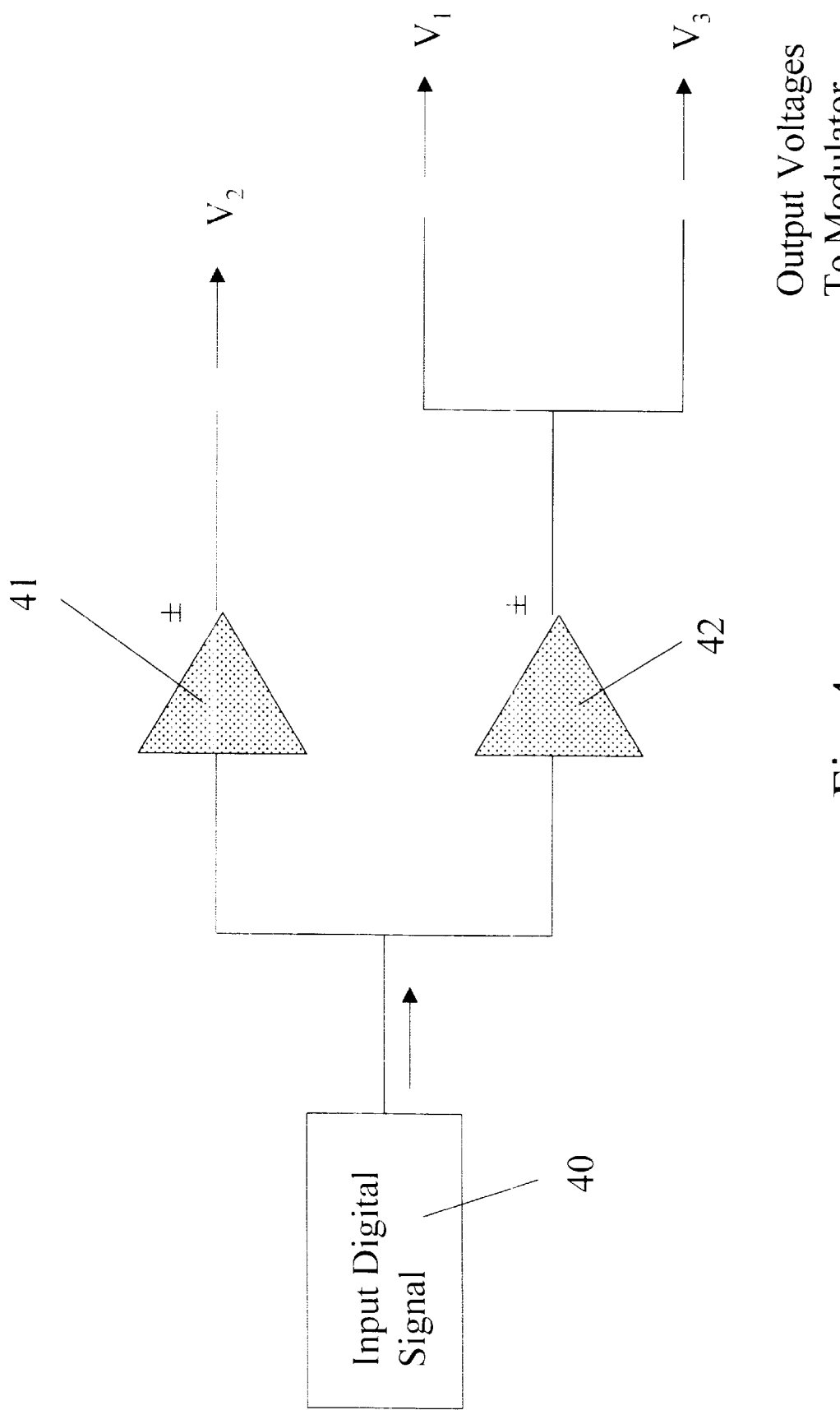
FIG. 4 is a schematic diagram illustrating an electrical drive for the Mach Zehnder interferometer type modulator in the present invention.

FIG. 4 is a schematic diagram illustrating derivation of the drive voltages from an input signal. The input signal 40 is divided into two signals having the same amplitude and phase. Each signal is separately amplified by amplifiers 41 and 42 having adjustable polarity and gain. The signal from the amplifier 41 is applied to the electrode above the inner arm 11-2 of the optical waveguide 11. The signal outputted from the amplifier 42 is further divided into two identical amplitude and phase signals, which have an appropriate relative phase and amplitude relationship to the signal from amplifier 41. These two signals may be reamplified (not shown in FIG. 4). The signals are then applied to the electrodes above the outer arms 11-1 and 11-3 of the optical waveguide 11. A phase tuner or adjustment in input lines may be used in implementing this configuration.

Under these conditions, an output optical intensity from the interferometer is given as follows:

$$I = I_o \cos^2\left[\eta \Gamma\left(\frac{V_{1,3}(t) - V_2(t)}{2}\right)\right] \quad (1)$$

Where $V_{1,3}(t)$ and $V_2(t)$ are the voltages applied to the electrodes above the outer and inner arms in the interferometer, respectively. $I_0$ is the input optical intensity while $\Gamma$ is the overlap integral associated with the interferometer arms below each of the electrodes to which voltages are applied (i.e. $\Gamma_1=\Gamma_2=\Gamma_3$). The overlap integral is the spatial integral of the optical intensity times the vertical component of the applied its electric field. Typically, the overlap integrals are normalized to an applied voltage of 1 volt, and to an integrated optical intensity of unity. In addition, $\eta$ is a constant given as follows:

$$\eta = \pi L n_e^3 r_{33}/\lambda_0 d \quad (2)$$

Here, L is an electrode length, d an electrode inner edge separation, $n_e$ the LiNbO$_3$ refractive index, and $r_{33}$ an electrooptic coefficient. The drive voltages are represented by:

$$V_{1,3}(t) = V_{10,30} \sin(\omega t) \quad (3a)$$

and $$V_2(t) = V_{20} \sin(\omega t) + V_b \quad (3b)$$

where $V_b$ is a DC bias voltage applied to the inner arm.
For this case, the chirp parameter a for small driving signals is given by the following equation.

$$\alpha = \left(\frac{V_{20} + V_{10,30}}{V_{10,30} - V_{20}}\right) \cot\left[\frac{\eta \Gamma V_b}{2}\right] \quad (4)$$

From equation (1), the quadrature condition (i.e. linear operating point of the modulator) is given as follows:

$$\eta \Gamma V_b = \pm \pi/2 \quad (5)$$

When equations (4) and (5) are combined, $\alpha$ is obtained as follows:

$$\alpha = \pm\left(\frac{V_{20} + V_{10,30}}{V_{10,30} - V_{20}}\right) \quad (6)$$

By varying the signs and magnitudes of the voltages in equation (6), values of the chirp parameter $\alpha$ are obtained in the range of $-\infty < \alpha < +\infty$. For example, for $V_{20} = -V_{10,30}$, $\alpha = 0$. For $V_{20} = V_{10,30}$, $\alpha = \pm\infty$. The sign of the chirp parameter can be changed by changing the sign of $V_b$, which changes the sign of the phase difference used to achieve the bias. In other words, the phase bias can be changed from $+\pi/2$ to $-\pi/2$. Alternatively the sign of the chirp parameter can be changed by switching the voltages applied to the inner and outer arms of the interferometer.

It is preferable that the inner arm is applied with a voltage greater than the outer arms (i.e. $|V_{20}| > |V_{10,30}|$). This condition is obtained for any value and sign of a by choosing an appropriate sign for the bias voltage, $V_b$. This reduces the overall drive voltage requirements for the modulator because the power requirements are $P_{20}$ and $2P_{10,30}$ where $2P_{10,30}$ is divided to supply $V_{10}$ and $V_{30}$. This is particularly true when one voltage approaches zero so that values of the chirp parameter are close to $\pm 1$.

Using the above described approach, a 50$\Omega$ electrode structure that is velocity matched to optical modes in LiNbO$_3$ can readily be designed in the present invention. This approach may be used to obtain any value of chirp, zero or non-zero, in the optical modulator. Thus, the modulator in the present invention is electrically tunable to have any desired value, so that it can be used in a wavelength division multiplexed optical transmission system.

It will be apparent to those skilled in the art that various modifications and variations can be made in the optical modulator employing a three arm interferometer for controlling a chirp parameter in the present invention without departing from the spirit or scope of the inventions. Thus, it is intended that the present invention cover the modifications and variations of this invention provided they come within the scope of the appended claims and their equivalents.

What is claimed is:

1. An electrically tunable optical modulator, comprising:
   a substrate having an electrooptical effect;
   an optical waveguide having first, second, and third cascading portions in the substrate, and transmitting an optical field;
   a first coplanar waveguide electrode having a first part over the first cascading portion and second and third parts extending beyond the first cascading portion;
   a second coplanar waveguide electrode having a fourth part over the second cascading portion and fifth and sixth parts extending beyond the second cascading portion;
   a third coplanar waveguide electrode having a seventh part over the third cascading portion and eighth and ninth parts extending beyond the third cascading portion;
   a fourth coplanar waveguide electrode formed to have a first distance from the first coplanar waveguide electrode;
   a fifth coplanar waveguide electrode formed between the first and second coplanar waveguide electrodes to have second and third distances, respectively;
   a sixth coplanar waveguide electrode formed between the second and third coplanar waveguide electrodes to have fourth and fifth distances, respectively;
   a seventh coplanar waveguide electrode formed to have a sixth distance from the third coplanar waveguide electrode; and
   a voltage source supplying voltages to the first, second, and third coplanar waveguide electrodes, wherein the fourth to seventh coplanar waveguide electrodes are grounded and the first to sixth distances are substantially the same, so that electrooptic overlap integrals of each cascading portion of the optical waveguide are the same.

2. The optical modulator according to claim 1, wherein the first, second, and third coplanar waveguide electrodes each have a width which is substantially the same.

3. The optical modulator according to claim 2, wherein the width is in the range of 5 to 10 µm.

4. The optical modulator according to claim 1, wherein the fourth to seventh coplanar waveguide electrodes each have a width which is substantially greater than the widths of the first to third coplanar waveguide electrodes.

5. The optical modulator according to claim 1, wherein the substrate includes Z-cut LiNbO$_3$.

6. The optical modulator according to claim 1, further comprising a buffer layer on the substrate including the optical waveguide.

7. The optical modulator according to claim 6, wherein the buffer layer has a thickness in the range of 0.25 to 1.5 µm.

8. The optical modulator according to claim 6, wherein the buffer layer is formed of $SiO_2$.

9. The optical modulator according to claim 1, wherein the first, second, and third coplanar waveguide electrodes, together with their adjacent ground electrodes, are each formed to have an impedance of about 50Ω.

10. The optical modulator according to claim 1, wherein the first, fourth, and fifth; the second, fifth, and sixth; and the third, sixth, and seventh coplanar waveguide electrodes each are connected to one another through a terminating resistor.

11. The optical modulator according to claim 1, wherein the first, second, and third cascading portions are separated from one another, so that the first, second, and third coplanar waveguide electrodes are electrically independent from one another.

12. The optical modulator according to claim 1, wherein the voltages applied to the first and third coplanar waveguide electrodes are identical amplitude and phase signals.

13. The optical modulator according to claim 1, wherein a voltage from the voltage source is divided and amplified by first and second amplifiers having an adjustable gain and polarity.

14. The optical modulator according to claim 13, wherein the second amplifier supplies identical input signals to the first and third coplanar waveguide electrodes.

15. The optical modulator according to claim 14, wherein the identical input signals are further amplified before being transmitted to the first and third coplanar waveguide electrodes.

16. A wavelength division multiplexed optical transmission system comprising an electrically tunable optical modulator, the modulator including:

a substrate having an electrooptical effect;

an optical waveguide having first, second, and third cascading portions in the substrate, and transmitting an optical field;

a first coplanar waveguide electrode having a first part over the first cascading portion and second and third parts extending beyond the first cascading portion;

a second coplanar waveguide electrode having a fourth part over the second cascading portion and fifth and sixth parts extending beyond the second cascading portion;

a third coplanar waveguide electrode having a seventh part over the third cascading portion and eighth and ninth parts extending beyond the third cascading portion;

a fourth coplanar waveguide electrode formed to have a first distance from the first coplanar waveguide electrode;

a fifth coplanar waveguide electrode formed between the first and second coplanar waveguide electrodes to have second and third distances, respectively;

a sixth coplanar waveguide electrode formed between the second and third coplanar waveguide electrodes to have fourth and fifth distances, respectively;

a seventh coplanar waveguide electrode formed to have a sixth distance from the third coplanar waveguide electrode; and a voltage source supplying voltages to the first, second, and third coplanar waveguide electrodes, wherein the fourth to seventh coplanar waveguide electrodes are grounded and the first to sixth distances are substantially the same, so that electrooptic overlap integrals of each cascading portion of the optical waveguide are the same.

* * * * *